Nov. 6, 1962 M. J. KELLY 3,062,440

MULTISTABLE MAGNETIC CORE ACCUMULATOR

Filed Dec. 18, 1957

2 Sheets-Sheet 1

INVENTOR.
MARTIN J. KELLY
BY
Francis V. Giolma
ATTORNEY

Nov. 6, 1962 M. J. KELLY 3,062,440

MULTISTABLE MAGNETIC CORE ACCUMULATOR

Filed Dec. 18, 1957 2 Sheets-Sheet 2

United States Patent Office 3,062,440
Patented Nov. 6, 1962

3,062,440
MULTISTABLE MAGNETIC CORE ACCUMULATOR

Martin J. Kelly, Endwell, N.Y., assignor to International Business Machines Corporation, New York, N.Y., a corporation of New York
Filed Dec. 18, 1957, Ser. No. 703,650
4 Claims. (Cl. 235—92)

Figure 1A:
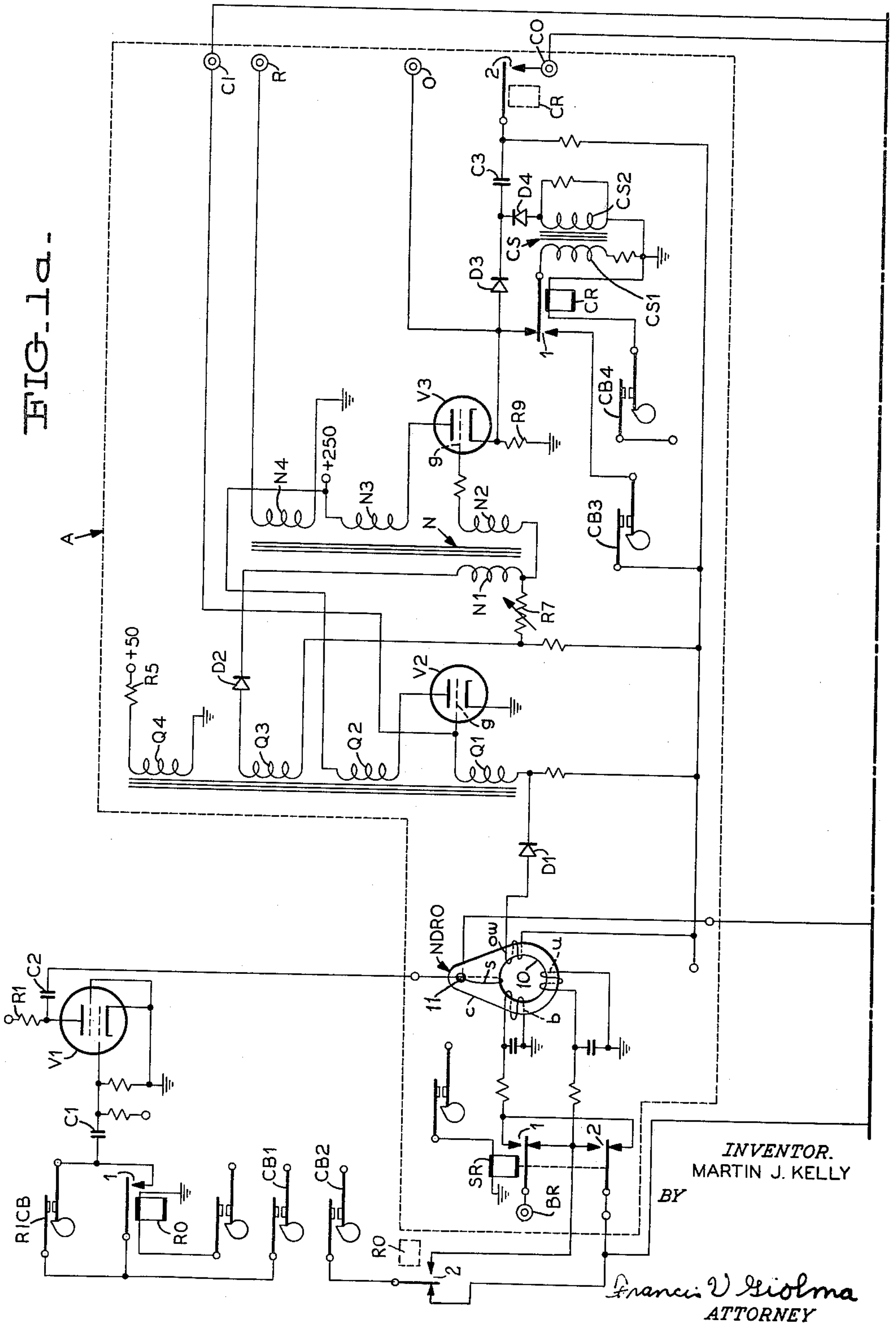

This invention relates generally to multistable magnetic core devices, and it has reference in particular to a multistable magnetic core decimal accumulator.

One object of this invention is to provide a novel accumulator utilizing multistable magnetic core elements.

Another object of the invention is to provide an improved counter utilizing a multistable magnetic core which receives cumulative switching pulses from a magnetic core quantizer so that temperature compensation is automatically included.

Yet another object of the invention is to provide a reliable static counter operated by accumulated incremental pulses from a quantizing circuit which releases incremental pulses in response to input signals.

It is an important object of this invention to provide for using a nondestructive readout core gate in a magnetic counter.

Yet another important object of the invention is to provide in a multistable magnetic counter for using a nondestructive readout core as an entry gate, and another magnetic core device for storing a carry pulse.

It is also an object of the invention to provide a counter that is simple and inexpensive to manufacture, and is reliable and efficient in operation.

Other objects of the invention will be pointed out in the following description and claims and illustrated in the accompanying drawings, which disclose, by way of examples, the principle of the invention and the best mode, which has been contemplated, of applying that principle.

Figure 1B:
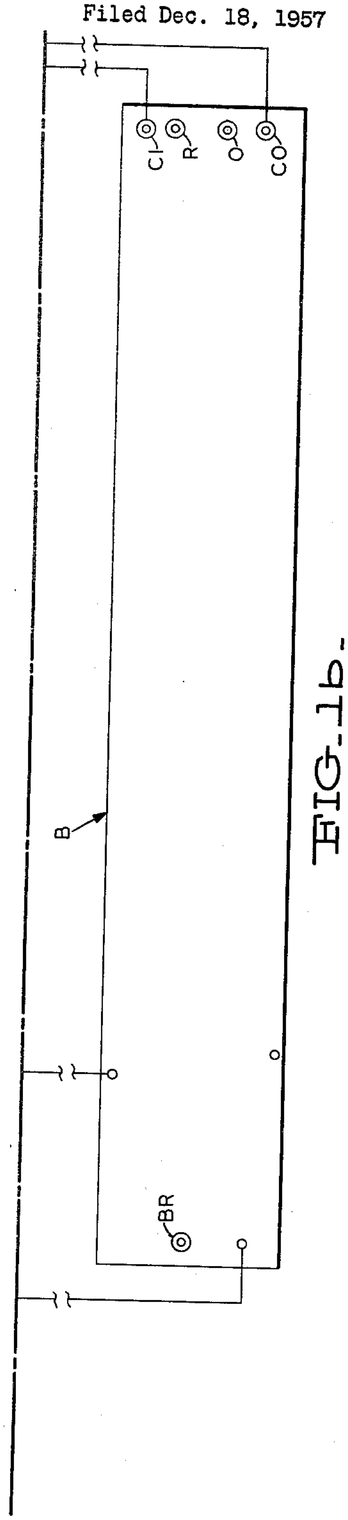
Figure 2:
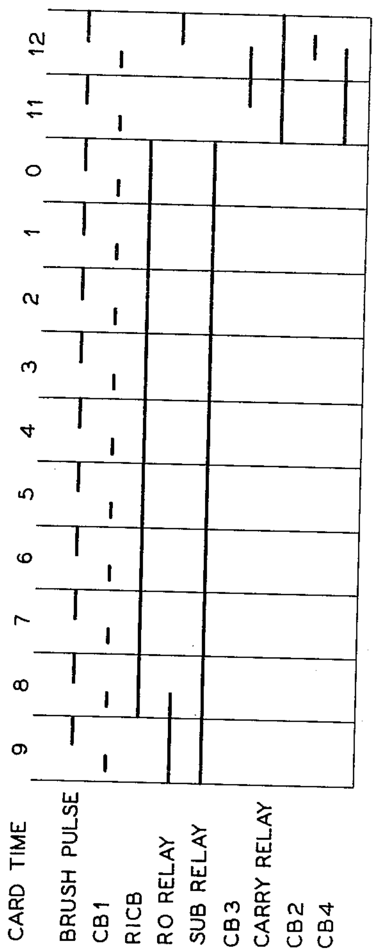

In the drawings:

FIGS. 1A and 1B taken together are a circuit diagram of an accumulator embodying the invention, and FIG. 2 is a timing chart illustrating the operating relations of different ones of the counter circuit breakers and relays in the circuit of FIG. 1.

Referring to FIGS. 1A and 1B of the drawings, the reference characters A and B designate generally identical decimal counters which are arranged in cascade relation in an accumulator for parallel entry. Since the circuitry of both counters is the same, only that of counter A has been shown in the interest of simplification. Each of the counters is provided with a counter or brush entry terminal BR, an output terminal O, a reset terminal R, a carry out terminal CO and a carry input terminal CI. While the counters A and B are herein shown as directly connected, it will be realized that instead of using only two such counters, more may be used, and the units counter A is typical of the low order or first counter, while the tens counter B represents the high order or last counter in the series. As shown, the carry output terminal CO of counter A is connected to the carry input terminal CI of counter B, this being typical of the connection between successive counters in the series. Because the counter B represents the last or high order of the series, the carry output terminal CO of counter B is connected back to the carry input terminal CI of counter A for the purpose of providing an end-around carry function, as will be explained hereinafter.

Referring to FIG. 1A, it will be seen that the heart of the counters, for example, counter A is a multistable magnetic core N comprising a tape wound core toroid of a rectangular hysteresis loop material and provided with a plurality of windings including an input winding N1, a hold winding N2, a reset winding N3 and an auxiliary reset control winding N4. The auxiliary reset winding N4 is connected to the reset terminal R for resetting the magnetic flux in the core N to the positive saturation of 9's condition in response to a suitable reset signal. The reset winding N3 is connected in the plate circuit of a control tube V3, which operates as an output switch, for the purpose of producing an output pulse signal and resetting the magnetic flux in the core N to a negative saturation value in response to an output pulse at the tenth or zero pulse in a series of consecutive signals. The hold winding N2 is connected to the control grid *g* of the tube V3 for applying thereto a signal to maintain the tube conductive during reset and provide an output signal at the cathode resistor R9 in response to the application of a pulse signal after the core N has been driven to saturation.

The input winding N1 of the multistable core N is connected to the transfer or output winding Q3 of a quantizer 9 which comprises also a tape wound core toroid of a rectangular hysteresis loop material having a hold winding Q1, a switching winding Q2, a transfer winding Q3 and a bias reset winding Q4. The reset winding Q4 is normally connected to the positive terminal of a fifty-volt source through a suitable resistor R5 for normally restoring the magnetic flux of the core Q to a negative saturation condition. The switching winding Q2 is connected in the plate circuit of a tube V2, which is rendered conductive in response to a pulse applied to the hold winding Q1, which is connected to the grid *g* of the tube, for the purpose of switching the core Q to the positive saturated condition. The change of flux in the core Q generates a voltage in the hold winding Q1, which hold the tube V2 conductive during the switching operation. When the core Q has been completely switched from negative saturation to positive saturation, voltage is no longer generated in the hold winding Q1, so that voltage is removed from the grid *g*, and the tube V2 ceases to conduct. The bias reset winding Q4 is then effective to reset the flux in the core Q to the negative saturation condition.

While the core Q was being switched from negative to positive saturation, a quantized energy pulse having a substantially constant volt-second value is available at the winding Q3, and is applied to the input winding N1 of the multistable core N, this pulse being of sufficient value to switch the core N one-ninth of the way from negative saturation to positive saturation. A diode D2 connected in circuit with windings Q3 and N1 prevents unwanted energy transfer when the core N is resetting.

Operation of the quantizer Q is effected by means of a NDRO gate (nondestructive readout) of the type which is described in detail in the copending application of Edgar E. Brown, Serial No. 383,568, now Patent No. 2,902,976, filed on October 1, 1953, and entitled Nondestructive Sensing of Magnetic Cores. As shown, the gate comprises a substantially pear-shaped core *c* having a major opening 10 adjacent the larger end and a minor opening 11 adjacent the smaller end, and is provided with a plurality of windings including an output winding *ow* which is connected through a diode D1 to the hold winding Q1 of the quantizer for the purpose of applying output pulses to the grid *g* of the tube V2. A figure of eight sample winding *s* is provided through the openings 10 and 11 for the purpose of applying clock or sample pulses to the core in predetermined timed relation with the brush pulses applied to the brush terminal BR in accordance with input signals which are to be counted. The core *c* is also provided with block and unblock windings $b$ and $u$ which are selectively connected to the brush terminal BR and to a source of control pulses, such as circuit breaker CB2, through contacts SR1 and SR2 of a subrelay SR for the purpose of blocking and unblocking the gate at suitable times and providing negative or positive output pulses, respectively, for each clock pulse after a particular brush pulse.

Clock or sample pulses are applied to the sample windings $s$ of each of the counters from a self-quenched thyratron V1 which is triggered by cycle point circuit breaker pulses from a circuit breaker CB1. The circuit breaker CB1 is connected through a read in filter circuit breaker RICB to the control grid $g$ of the thyratron V1 for triggering it in response to clock pulses beginning at approximately half past brush pulse time. The tube V1 is provided with a resistor R1 in its plate circuit which is sufficiently high value to limit the plate current and make the tube self-quenching. A capacitor C2, connected in the circuit with the sample windings and the plate $p$, cooperates to provide current pulses of approximately 500 milliamperes, which are adequate to produce the desired output signal from the NDRO gate.

The tube V3 in the output signal circuit of the multistable core N is provided with a connection from the cathode resistor R9 to the input winding CS1 of a carry storage magnetic storage device CS through normally closed contacts and armature CR1 of a carry relay CR, which is operated by a circuit breaker CB4 at the end of each machine cycle for transmitting a carry pulse from a circuit breaker CB3 in the event that the multistable core N has produced an output pulse during the counting cycle. The carry storage device CS comprises a tape wound core toroid of a rectangular hysteresis loop material having input and output windings CS1 and CS2. The input winding CS1 is normally connected to the cathode of the tube V3 through armature CR1 so that an output pulse from the tube V3 saturates the core CS, whereupon a subsequent carry pulse from the circuit breaker CB3 when the carry relay CR operates, resets the core and produces an output voltage from the winding CS2 which is applied to the carry output terminal CO, through a diode D4, a capacitor C3, and contacts CR2 of the carry relay. A diode D3 is connected between the cathode connection on the value V3 and the connection of the diode D4 to the capacitor C3 for preventing undesired feed back of the output signal.

In one mode of operation, the auxiliary reset winding N4 is arranged to reset the core N to positive saturation or the 9's condition. If a 6 is to be added to the counter, the circuit breaker CB2 will have closed at the end of a previous machine cycle, as shown in FIG. 2, to energize the block winding $b$, so that any output pulses in response to energization of the sample winding $s$ of the NDRO gate will be negative in character and ineffective. A brush pulse will be applied through contact SR1 to the unblock winding $u$ of the gate at 6 time. The following clock pulse at 5 time is then effective to provide a positive output signal, as are the following clock pulses at 4, 3, 2, 1 and 0 time. The first clock pulse at 5 time causes a pulse signal to be applied to the grid of the tube V2 rendering it conductive, and effecting energization of the switching winding Q2 to commence switching of the quantizer core Q. As explained hereinbefore, the changing of flux in the core Q induces a voltage in the hold winding Q1, which maintains the grid $g$ at an operating level. At the same time a voltage is induced in the transfer winding Q3 and applied to the input winding N1 of the multistable counter core N. Since the core N is already at positive saturation, the inductance of the winding N1 is relatively low, and the pulse signal is thereupon applied to the grid $g$ of the tube V3 to render it conductive. Current flowing through the reset winding N3 resets the magnetic core N to negative saturation, and a voltage is developed across the cathode resistor R9, which is applied to the input winding CS1 of the carry storage device CS through the normally closed contacts and armature CR1 of the carry relay CR, to effect saturation of the core and store this carry signal.

Successive clock pulses occurring at 4 time, 3 time, 2 time, 1 time and 0 time will successively operate the NDRO gate to produce output signals, which effect operation of the quantizer core Q to apply corresponding pulse signals to the input winding N1 of the multistable magnetic core N in the same manner as hereinbefore described, thus leaving the core N five-ninths saturated. At the end of the operating cycle, circuit breaker CB4 closes and effects operation of the carry relay CR, which transfers armatures CR1 and CR2. The carry pulse circuit breaker CB3 closes and applies a pulse to the input winding CS1 of the carry storage device CS. Since the core CS is previously saturated by the output signal from the V3 at 5 time, an output signal will be developed in the output winding CS2, which is applied through the carry relay armature CR2 to the carry out terminal CO of the counter A. This signal is applied to the carry input terminal CI of the counter B which, as shown, is connected to the grid $g$ of the tube V2 of counter B. This provides a quantizer output signal in the same manner as if a pulse has been applied to the quantizer Q of counter B from its NDRO gate. The tube V2 of counter B is rendered conductive so that the core Q of counter B is switched, and an output signal is applied from the output winding Q3 to the input winding N1 of the multistable magnetic core N of counter B. Since the core N of counter B is also in the positive saturation or 9's condition, the impedance of the input winding N1 is relatively low and the signal applied thereto is applied directly to the grid $g$ of valve or tube V3 of counter B to render this tube conductive. Accordingly, an output voltage appears across the cathode resistor R9 of counter B, and since the carry relay CR of counter B is also operated, this signal is applied to the diode D3 and capacitator C3, armature CR2, carry out terminal CO of counter B to the carry input terminal CI of counter A. Here this input signal effects operation of the tube V2 of counter A and causes the quantizer Q of counter A to apply a pulse signal to the winding N1 of the multistable magnetic core N of counter A. Since this core was five-ninths saturated as hereinbefore explained, this end-around carry signal from the counter B moves the core N of counter A one step near saturation, thus leaving it with a 6 count thereon corresponding to the 6 signal read by the brush BR.

To read out the quantity registered in the accumulator A, the unblock winding $u$ of the NDRO gate is energized by a set-up pulse at the end of the previous cycle through the circuit breaker CB2, and transfer contact RO2. The readout relay contact RO1 is closed, and clock pulses are applied to the sample winding $s$ of the gate. Since the counter A contains a 6, the NDRO gate will produce positive output pulses for each of the 9, 8, 7 and 6 counts. The quantizer Q will be correspondingly pulsed. The quantizer Q applies successive pulses, 4 in number to the input winding N1 of the multistable magnetic core N. The core N is driven to positive saturation at the third of these pulses, inasmuch as the core had a 6 in it, and was therefore six-ninths saturated prior to readout. Therefore, with the occurrence of the fourth or number 6 pulse, an output pulse is applied to the tube V3, which is rendered conductive and applied an output signal to the output terminal O, to indicate the presence of a 6 in the counter.

Using a magnetic core device as a quantizing source in conjunction with the multistable magnetic core adder has the advantage that temperature compensation is thereby built into the circuit. A counter embodying the features of the invention has been tested with circuit breaker drives and controls at a speed of 1,000 cards per minute, and a test operation has been conducted of an accumulator comprising two counters with the gates always opened and cross carrying into each other. To date, some 250 million error-free operations have been recorded. Such a counter requires no regulated power supplies, and the cores themselves are inherently rugged and have a long life. While the counters have been shown and described as operating from a normal condition of positive saturation, it will be realized that they may readily be operated with a normally negative saturated condition, without the end-around carry connection from a carry out terminal of the high order to the carry input terminal of the low order.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention therefore, to be limited only as indicated by the scope of the following claims.

What is claimed is:

1. In a counter, a multistable magnetic core, quantizing means operable to apply to said core pulses of a predetermined value less than the value required to saturate said core, means for producing a signal at each cycle point, means for producing a signal at a particular digit time in accordance with a quantity to be counted, nondestructive readout gate means operable in response to said signals to effect operation of the quantizing means, means controlled by the core for producing an output signal in response to a predetermined number of pulses, means including a saturable core having a winding energized by said output signal for storing the output signal, means operable to reset the multistable core in response to said output signal, and means for blocking the gate means at the end of a cycle to render it operable by a digit signal in a subsequent cycle.

2. In a counter, a multistable magnetic core, switch means controlled by the magnetic core to provide a signal in response to a predtermined number of input signals to the core, quantizing means applying a quantized signal to the magnetic core, nondestructive readout magnetic core gate means having a sample winding energizable to produce output pulses and having block and unblock windings selectively controlling the polarity of the output pulses, circuit means connected to apply the output pulses to the quantizing means means periodically energizing the sample winding, and means selectively energizing one of the block and unblock windings before each cycle and at a predetermined digit time during a cycle to produce output signals in accordance with said digit, and output storage means comprising a saturable core with a winding energized by said signal for storing the output signal to produce a carry signal at a later time in a cycle.

3. A counter comprising, a multistable magnetic core member having a plurality of windings, quantizing means connected to effect energization of one of said windings in response to a pulse signal to increase the magnetization of the core a predetermined portion of the saturation value, a carry storage device having a magnetic core with input and output windings, switch means connected to effect energization of the input winding to store a signal in response to an output pulse from another one of the plurality of windings, circuit means connected to said input winding to apply a carry pulse thereto at the end of an operating cycle for producing an output carry signal from the storage device, and gate means including a nondestructive readout magnetic core device having an output winding connected to effect operation of the quantizing means, a sample winding connected to be energized at each of a plurality of points in each operating cycle for producing output pulses of one polarity, and block and gating windings connected to be energized to produce an output pulse of the opposite polarity before each operating cycle and at a predetermined digit time in each cycle according to the digit to be counted, respectively.

4. In combination, a first low order counter having a multistable core with an input winding, an output winding and a reset winding; means including quantizing means and a nondestructive readout magnetic core device connected to apply to the input winding in response to each input pulse a unidirectional pulse sufficient to increase the magnetization of the core by one-ninth of the saturation value; an entry terminal connected to the quantizing means said magnetic core having block and unblock windings for controlling the direction of the unidirectional pulses; a carry out terminal; switch means connected between the output winding and the carry out terminal to produce an output signal in response to saturation of said core, and a carry input terminal connected to effect operation of the quantizing means; a second high order counter having a multistable core with an input winding, an output winding and a reset winding; quantizing means connected to apply to the input winding of said second counter in response to each input pulse a pulse sufficient to increase the magnetization of the core by one-ninth the saturation value; an entry terminal connected to the quantizing means; a carry out terminal; switch means connected between the output winding and the carry out terminal of said second counter, and a carry input terminal connected to effect operation of the quantizing means; circuit means including said switch means connected to the reset windings to reset the cores; circuit means including a saturable core having an input winding energized by the output signal of said first core and an output winding connected to apply a carry signal to the carry input terminal of the second high order counter in response to a carry signal at the carry out terminal of the first counter; and additional circuit means connecting the carry out terminal of the high order counter to the carry input terminal of the first counter.

References Cited in the file of this patent

UNITED STATES PATENTS

| | | |
|---|---|---|
| 2,514,036 | Dickinson | July 4, 1950 |
| 2,521,350 | Dickinson | Sept. 5, 1950 |
| 2,706,597 | Crosman | Apr. 19, 1955 |
| 2,777,098 | Duffing et al. | Jan. 8, 1957 |
| 2,808,578 | Goodell et al. | Oct. 1, 1957 |
| 2,818,555 | Lo | Dec. 31, 1957 |
| 2,824,697 | Pittman et al. | Feb. 25, 1958 |
| 2,824,698 | Van Nice et al. | Feb. 25, 1958 |
| 2,895,672 | Dickinson | July 21, 1959 |

OTHER REFERENCES

Hertz: A Magnetic Scaling Circuit, Journal Applied Physics, vol. 22, January 1961, pp. 107, 108.

IBM Training Manual, Form DE-1-0775-OG, "Functional Unit Training-Accumulating Mechanisms," 1952, page 10.